Dec. 9, 1924.

W. F. STERNBERG

TRACTOR

Filed March 21, 1921

INVENTOR
W.F. Sternberg
BY
ATTORNEYS

Dec. 9, 1924.
W. F. STERNBERG
TRACTOR
Filed March 21, 1921   2 Sheets-Sheet 2
1,518,465
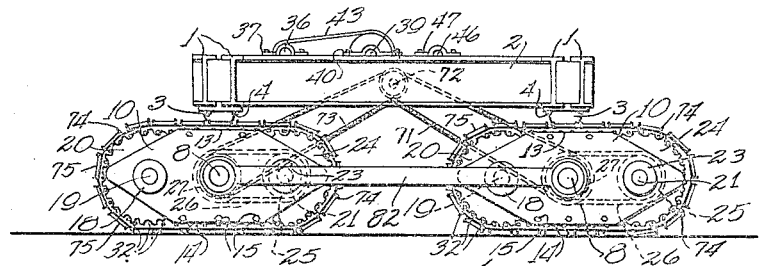
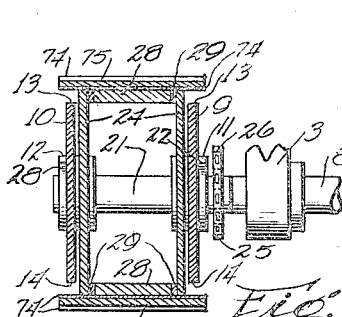
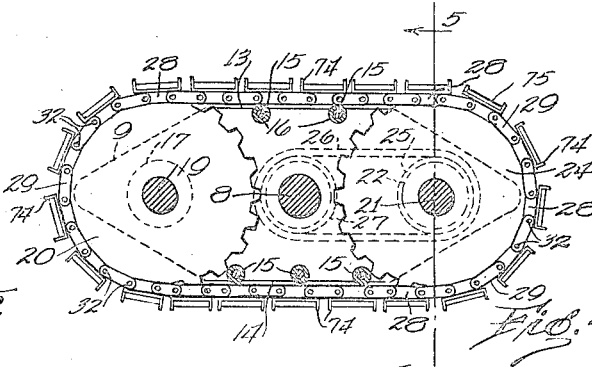
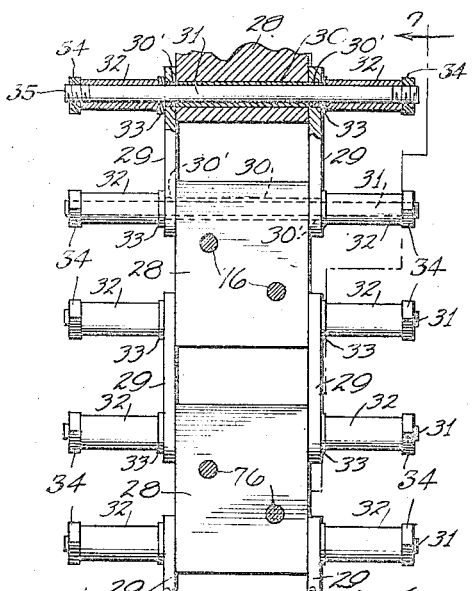
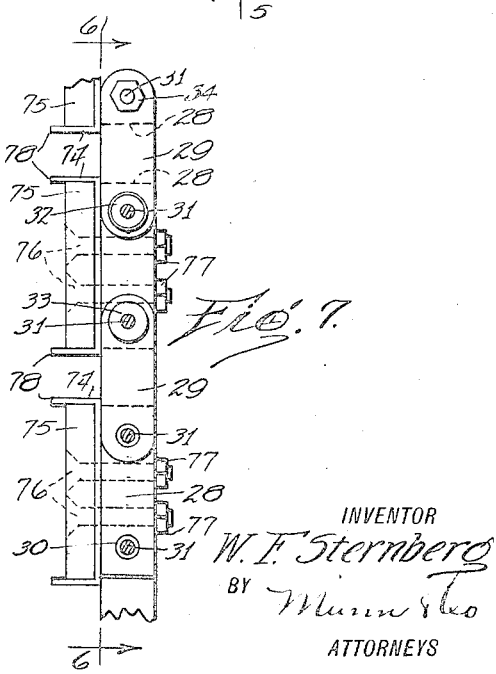
INVENTOR
W. F. Sternberg
BY Munn & Co
ATTORNEYS Patented Dec. 9, 1924.

1,518,465

UNITED STATES PATENT OFFICE.

WILLIAM F. STERNBERG, OF PIPER CITY, ILLINOIS.

TRACTOR.

Application filed March 21, 1921. Serial No. 453,962.

*To all whom it may concern:*

Be it known that I, WILLIAM F. STERNBERG, a citizen of the United States, and a resident of Piper City, in the county of Ford and State of Illinois, have invented a new and useful Improvement in Tractors, of which the following is a full, clear, and exact description.

My invention relates to tractors, and it consists in the combinations, constructions and arrangements herein described and claimed.

An object of my invention is to provide a tractor in which the driving force may be transmitted to the several ground gripping members coincidently and equally.

A further object of my invention is to provide a tractor, having means operable selectively to occasion the driving of the ground gripping members positioned at either side of a tractor frame independently of the ground gripping members at the other side of the frame, whereby the device may be guided as required.

A further object of my invention is to provide a tractor having ground gripping members each arranged for rotation about the axis of the shaft transmitting a driving force thereto, whereby the ground gripping members will function effectively when positioned at any angle to the horizontal and when the several ground gripping members are positioned at different angles.

A further object of my invention is to provide a tractor that will be driven in reverse when a belt included in the driving mechanism is re-arranged with respect to the parts engaged thereby.

A further object of my invention is to provide a device of the character described that is simple in construction and operation, not likely to get out of order easily, and thoroughly effective for the purpose intended.

Other objects and advantages will appear in the following specification, and the novel features of the invention will be particularly pointed out in the appended claim.

My invention is illustrated in the accompanying drawings, forming part of this application, in which—

Figure 3 is a side elevation of the device,

Figure 4 is a detail of a portion of the device,

Figure 5 is a section along the line 5—5 of Fig. 4,

Figure 6 is an enlarged detail of a fragmentary portion of the device along the line 6—6 of Figure 7, portions being broken away, and, Figure 7 is a section along the line 7—7 of Fig. 6.

Figure 1:
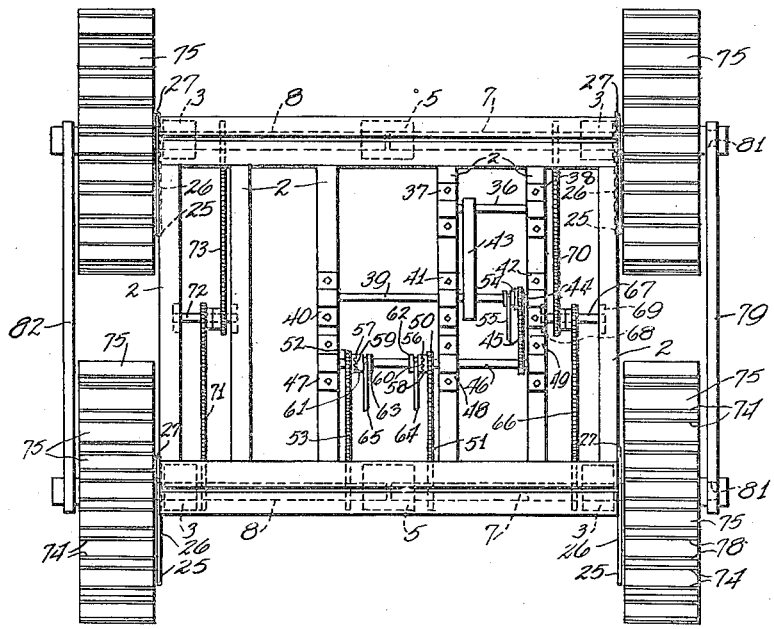
Figure 1 is a plan view of the device.

In carrying out my invention, I provide a rigid frame comprising a plurality of cross members 1 secured in any suitable and well known manner to a plurality of longitudinal members 2. I prefer to use I-beams as frame members and to arrange two of the cross members 1 at each end of the frame, the longitudinal members 2 being arranged in spaced apart parallel relation with their ends secured to the members 1 contiguous thereto, two of the members 2, which will hereinafter be referred to as the side frame members, connecting with the contiguous members 1 at the ends of the latter. Similar hanger brackets 3—3 are secured, as by bolts 4, to the end frame members at each end of the frame. It will be noted that the hanger brackets 3—3 are secured to the end frame members to depend therefrom at opposite ends thereof. A cooperating hanger bracket 5 alined with the hanger brackets 3—3 is provided at each end of the frame and is secured, as by bolts 6, to the end frame members midway between the hanger brackets 3—3. Co-axially alined shafts 7 and 8 are journalled in the hanger brackets 5 and 3—3 at each end of the frame, the adjacent ends of the shafts being supported in spaced apart relation by the hanger 5 while the remote ends thereof project beyond the hangers 3—3 and each has rotatably mounted thereon adjacent its outer end a frame for supporting a ground gripping mechanism. It will thus be observed that I provide two co-axially alined shafts at the front end of the frame and two co-axially alined shafts at the rear end of the frame parallel with the corresponding shafts at the front end of the frame and identical therewith in essential respects. Since each of the shafts has mounted thereon adjacent its outer end a frame for supporting a ground gripping mechanism, it follows that the frame is supported for movement at four points. The means carried by each shaft at its outer end for supporting the tractor frame for movement is precisely identical with the means arranged at the outer ends of the other shafts for a like purpose. I shall therefore confine my description to the means carried at the outer end of one shaft and have used the same reference numerals to indicate like parts.

The frame rotatably mounted on the shaft at its outer end comprises a pair of hexagonal plates 9 and 10, each formed with a central boss 11 and 12, respectively, provided with a central opening through which the shaft is projected. Of the sides of each plate, opposite sides indicated at 13 and 14 are parallel with one another and longer than each of the other sides. These sides are normally positioned in horizontal planes when the surface traversed is level and consequently the weight carried by the frame is distributed over a considerable area. The plates 9 and 10 are spaced apart by a plurality of rods 15, certain of which have their ends fast in the plates 9 and 10 along the upper edges or sides 13 thereof while others have their ends fast in the plates along the lower edge or side 14 thereof. Each of the rods 15 has rotatably mounted thereon a roller 16 extending practically the entire distance from one plate to another and having the periphery thereof flush with the corresponding edges or sides of the plates. Journaled in bearings 17 and 18 disposed at spaced equal distances from the converging sides at corresponding ends of the plates 9 and 10 is a stub shaft 19 having mounted thereon spaced apart similar sprockets 20—20. At an equal distance from the center of the plates, which coincides with the axis of the shaft upon which the plates are mounted, is a stub shaft 21 that is journalled in bearings 22 and 23 secured in the plates 9 and 10, respectively, so that the stub shafts 19 and 21 are parallel with one another and with the shafts 7 and 8, and are diametrically opposed to one another with respect to the axis of the shaft upon which the plates 9 and 10 are mounted. Rigidly mounted on the stub shaft 21 are spaced apart sprockets 24—24, which correspond in size and arrangement with the sprockets 20—20. The stub shaft 21 has rigidly mounted thereon a sprocket 25 that is driven by a chain 26 passed around a sprocket 27 rigidly mounted on the shaft supporting the plates 9 and 10.

The ground gripping means are mounted on the sprockets 20—20 and 24—24 and comprise alined flat tread carrying plates 28 connected at their ends in spaced apart relation to pairs of links 29—29 by means of rods 31. Sleeves 30 and bushings 30' are disposed in the plates 28 and links 29, respectively, and receive the rods 31. Mounted on the projecting ends of the rod or pintle 31 are rollers 32—32 which have their inner ends spaced from the links 29 by washers 33—33 and are maintained on the ends of the pintle 31 by nuts 34—34 having a threaded engagement with the latter, as at 35—35. The rollers 32—32 engage the teeth of the sprockets 20—20 and 24—24 and consequently the endless belt formed of the connected tread carrying plates 28 and links 29—29 is driven by the sprockets 24—24. The contact of the plates 28 with the rollers 16 prevents the sagging of the endless belt at points intermediate the sprockets 20—20 and 24—24.

From the foregoing description of the various parts of the device, the operation thereof will be readily understood. A suitable prime mover (not shown) will in service be positioned on the tractor frame and operatively connected with a shaft 36 journaled in bearings 37 and 38 secured to adjacent longitudinal frame members 2. A shaft 39 journaled in bearings 40, 41, and 42 secured to the frame is parallel with the shaft 36 and driven by a belt drive 43 engaged by the latter. A sprocket 44 loosely mounted on the shaft 39 has passed therearound a chain 45 having a driving connection with a shaft 46. The latter is journaled in bearings 47, 48, and 49 secured to the tractor frame and is parallel with the shaft 39 and with the shafts 7 and 8. A sprocket 50 loosely mounted on the shaft 46 is operatively connected by chain drive 51 with the shaft 7 at the rear end of the tractor frame. A sprocket 52 loosely mounted on the shaft 46 is operatively connected by a chain drive 53 with the shaft 8 located at the rear end of the frame. The sprocket 44 is formed to co-act with a clutch member 54 of an ordinary construction that is feathered to the shaft 39 and arranged to be controlled by an operating arm 55 so that it can be moved at will to engage or disengage the sprocket 44. The sprockets 50 and 52 are each formed with clutch members 56 and 57, respectively, integral therewith, and these clutch members have teeth 58 and 59, formed with straight sides, and adapted to be engaged by similarly formed teeth 60 and 61 of clutch members 62 and 63, respectively. The latter are feathered to the shaft 46 and are arranged to be moved by operating members 64 and 65, respectively, to each engage or disengage its cooperating clutch member. The shaft 7 positioned at the front end of the tractor is driven by connection with the shaft 7 at the rear end of the tractor, this connection being effected by means of a chain drive 66 connected with an intermediate shaft 67 that is journaled in bearings 68 and 69 secured to the side frame member and the adjacent longitudinal frame member. The intermediate shaft 67 is in turn operatively connected by a chain drive 70 with the shaft 7 at the front end of the tractor. In a like manner, the shaft 8 positioned at the front end of the tractor is arranged to be driven by the shaft 8 at the rear end of the tractor through the chain drive 71, an intermediate shaft 72, and a chain drive 73.

Each of the tread carrying plates 28 has secured to its outer surface a tread member comprising a channel 74 having a spacing block 75 disposed therein, the connection with the tread carrying plate being effected by means of bolts 76 each having its head countersunk in the block and being projected through the plate 28 for engagement with a nut 77 at the inner side of the plate. The legs of the channel 74 project outwardly beyond the block 75, thereby defining spaced apart parallel cleats 78 that grip the surface to be traversed by the device. A link 79 is formed with a boss at each end thereof and these bosses have openings 81—81 therethrough adapted to receive the ends of the parallel shafts 7. A similar link 82 connects the shafts 8 at their ends. Consequently, the shafts 7 and 8 at one end of the tractor will be maintained in co-axial alinement with one another and parallel with the corresponding shafts at the other end of the tractor and this arrangement is not likely to be affected by the stresses placed on the several shafts in service.

By operating the clutch controlling member 55, the tractor may be started or stopped at will. When the clutch 62 disengages the clutch 56, no power will be transmitted to the shafts 7. When the clutch 63 disengages the clutch 57, no power will be transmitted to the shafts 8. Obviously, when both the shafts 7 and 8 are driven, a driving force will be transmitted equally and coincidently to the several ground gripping members. The teeth of the clutch members controlling the operation of the shafts 7 and 8 have straight sides and consequently are equally effective when the tractor is being operated in reverse. The movement of the tractor will be reversed when the belt 43 is given a half twist.

Figure 2:
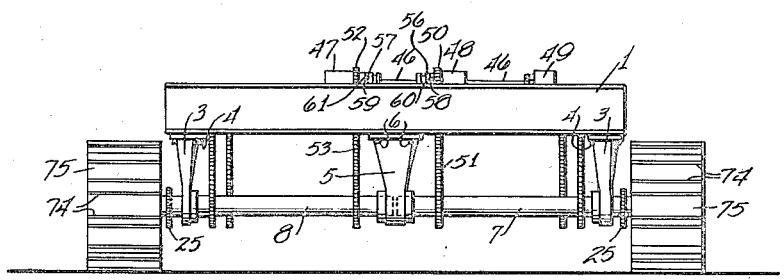
Figure 2 is an end view of the same.

One of the principal advantages of the device lies in the construction of the ground gripping members and the construction of the means for supporting the same. It will be noted that the ground gripping members are supported for movement about the axis of the shaft imparting a driving force thereto and that the movement of the ground gripping means about the axis of the shaft does not interfere with the functioning of the latter. Consequently, the device can be operated effectively where the surface to be traversed is very uneven as each ground gripping member will function with equal effectiveness when at any angle to that illustrated in Figures 1, 2, 3, and 4, as it will when at the angle shown with respect to the frame.

The device is relatively simple in construction, strong and durable, and thoroughly practical commercially.

I claim:

In a device of the type described a frame having endless treads for supporting said frame, sprockets, carried by said frame and supporting said treads, said treads comprising a plurality of channel irons having outwardly extending lugs which project transversely across said tread, supporting members for said channel irons, links connecting said supporting members together, rods securing said links to said supporting members, and rollers mounted on said rods and adapted to engage with said sprockets, said channel irons projecting over the sides of said sprockets so as to keep the sprockets free of the ground and prevent them from becoming clogged with dirt and the like.

WILLIAM F. STERNBERG.